United States Patent [19]
Yamauchi

[11] Patent Number: 4,837,648
[45] Date of Patent: Jun. 6, 1989

[54] FLOATING MAGNETIC HEAD

[75] Inventor: Shiro Yamauchi, Amagasaki, Japan

[73] Assignee: Mitsubishi Denki Kabushiki Kaisha, Japan

[21] Appl. No.: 181,071

[22] Filed: Apr. 13, 1988

[30] Foreign Application Priority Data

Apr. 16, 1987 [JP] Japan .................. 62-93767

[51] Int. Cl.$^4$ .................. G11B 5/60; G11B 21/21
[52] U.S. Cl. .................................................. 360/103
[58] Field of Search ......................................... 360/103

[56] References Cited

U.S. PATENT DOCUMENTS 4,457,822  7/1984  Asano et al. .................. 204/252
4,497,701  2/1985  Murata et al. ................. 204/430

FOREIGN PATENT DOCUMENTS 61-80574  4/1986  Japan .

OTHER PUBLICATIONS

Farrington et al, "Hydronium Beta Alumina: A Fast Proton Conductor", Mat. Res. Bull., vol. 13, pp. 763–773, 1978.

Primary Examiner—Robert S. Tupper
Attorney, Agent, or Firm—Leydig, Voit & Mayer

[57] ABSTRACT

A floating magnetic head has two or more slider portions with floating surfaces formed thereon generally in parallel with a plane on which a magnetic disk rotates. The magnetic head body has grooves formed between the adjacent slider portions in a facing relation with a recording surface of the magnetic disk. Water removing members are formed in at least a portion of the grooves and the floating surfaces of the slider portions for removing water formed on the magnetic disk surface by electrolyzing the water. The water removing member comprises a cathode electrode, a proton-conductive solid laminated on the cathode electrode, an anode electrode laminated on the proton-conductive solid and facing the surface of the magnetic disk. Water films formed in the gaps between the surface of the magnetic disk and the floating surfaces of the slider portions are removed by electrolysis effected by the water removing members.

14 Claims, 4 Drawing Sheets

FLOATING MAGNETIC HEAD

BACKGROUND OF THE INVENTION

This invention relates to a floating magnetic head provided in a magnetic disk apparatus.

Conventionally, a magnetic disk apparatus which is used as a peripheral unit of a computer system is installed in a specialized air-conditioned room. Recent technological progress has allowed computers to be reduced in size and weight and, hence, has brought about reductions in manufacturing costs. Such computers are not always placed in such specialized air-conditioned rooms now, and they are sometimes placed in an ordinary environment. There is consequently a possibility of magnetic disk apparatus being placed in an ordinary environment and becoming more affected by ambient temperature and humidity.

If the ambient temperature around a magnetic disk apparatus placed in an ordinary environment rapidly decreases so that water vapor pressure in the magnetic disk apparatus becomes supersaturated which is higher than saturated water vapor pressure, the water vapor in the air is condensed and forms a thin film of water between a magnetic disk used as a recording medium and a magnetic head for writing or reading information or, to be exact, between the magnetic disk and a slider portion of the main body of the magnetic head. As a result, an attraction phenomenon is caused, that is, the slider portion and the surface of the magnetic disk become fixedly attached to each other. If the magnetic disk starts to rotate in this attached state, an excessive force is applied to the support system of the magnetic head. There is therefore a possibility of the magnetic head being broken.

To prevent this phenomenon, a method such as the one disclosed in Japanese Patent Laid-Open No. 61-80574 has been used. In this method, the magnetic head is thermally deformed through electric heating effected in order to reduce the contact area between the magnetic disk and the slider portion and to generate heat in the slider portion.

FIG. 1 is a perspective view showing an example of a floating magnetic head provided in a conventional magnetic disk apparatus as disclosed in Japanese Patent Laid-Open No. 61-80574. FIG. 2 is a cross-sectional view taken along the line II—II of FIG. 1. A floating magnetic head 1A has a magnetic head body 2A in the form of a box called a monolithic head facing a recording surface 1a of a magnetic disk 1. A pair of slider portions 3A are formed on the magnetic head body 2A. The magnetic head body 2A has a side surface 2a which is paralled to the direction in which the magnetic disk 1 rotates, the pair of slider portions 3A each having a floating surface 3a which extends in parallel with the side surfaces 2a and which contacts the recording surface 1a in the vicinity of a side surface 2a, and a pair of grooves 2b which are formed between the slider portions 3A. A recording and reproducing portion 4 for reading data from or writing data on the recording surface 1a is formed on the head body 2A generally at the center thereof. A side electrode 5 is attached to each side surface 2a of the magnetic head body 2A. Short-circuit electrodes 6 which short-circuit the slider portions 3A are disposed in the grooves 2b. The side electrodes 5 are connected to a dc power source 7 which is turned on or off by a switch 8. As shown in FIG. 2, a thin water film 9 is formed between the recording surface 1a of the magnetic disk 1 and the floating surface 3a by the supersaturation of water vapor occurring therebetween when the ambient atmosphere becomes cool.

The operation relating to this magnetic head will be described below. The magnetic disk apparatus starts to perform the process of recording or reproduction when the switch 8 is closed. A current is then supplied from the positive terminal of the power source 7 to one of the side electrodes 5, so that it flows through the corresponding slider portion 3A, the short-circuit electrodes 6 and the other one of the slider portions 3A to the other one of the side electrodes 5, and thereafter returns to the power source 7 through the negative terminal thereof. At this time, heat is generated in the slider portions 3A and in other portions so that the temperature distribution in the magnetic head body 2A becomes nonuniform. In this case, the magnetic head body 2A is heated at the side facing the magnetic disk 1, therefore the floating surface 3a is convexly deformed by arching in the longitudinal direction. This deformation reduces the area of contact between the floating surface 3a and the recording surface 1a. At the same time, moisture condensed on the floating surface 3a is evaporated by the heat generated in the slider portions 3a. Occurrence of an attraction phenomenon is thus avoided.

However, it is necessary to heat the magnetic head body 2A to a considerably high temperature in order to heat and evaporate the water film 9 formed between the floating surface 3a and the recording surface 1a. Water vapor evaporated from the gap between the floating surface 3a and the recording surface 1a cannot easily be released therefrom to the ambient atmosphere around the magnetic disk apparatus. Further, as the operation of electric-power heating for preventing the attraction phenomenon is repeated, residual strains resulting from the heating accumulate in the magnetic head body 2A. There is therefore a possibility of irregularities occurring in the floating surface 3a, though this surface should be flat. If the floating magnetic head 1A having such irregularities is used to perform recording or reproduction on the magnetic recording surface 1a of the magnetic disk 1, there is a possibility of errors occurring in the output.

Since the conventional floating magnetic head has the above-described construction, the magnetic head body 2A should be repeatedly heated in order to prevent occurrence of the attraction phenomenon between the recording surface 1a and the floating surface 3a. Thus, there is a problem of irregularities occurring in the floating surface 3a in the heating and cooling cycles, resulting in reductions in head performance.

SUMMARY OF THE INVENTION

The present invention has been achieved with a view to overcoming these problems, and an object of the present invention is to provide a floating magnetic heat which is capable of preventing the above-described attraction phenomenon without causing irregularities in the floating surface of the slider.

To this end, the present invention provides a floating magnetic head comprising: a magnetic head body; a slider means provided on the magnetic head body and having a floating surface disposed generally in parallel with a plane on which a magnetic disk rotates, the floating surface capable of moving toward and away from a surface of the magnetic disk; and a water removing member formed in at least a portion of the floating surface of the slider means for electrolytically removing an existing water between the floating surface of the slider means and the surface of the magnetic disk.

In accordance with the present invention, the provision of the water removing member at least in a portion of the floating surface of the magnetic head body makes it possible to remove water film formed between the surface of the magnetic disk and the floating surface of the slider by electrolyzing the water by means of the water removing member. The need for heating the magnetic head is thereby eliminated. There is no possibility of the floating surface deforming.

DESCRIPTION OF THE PREFERRED EMBODIMENTS

Figure 1:
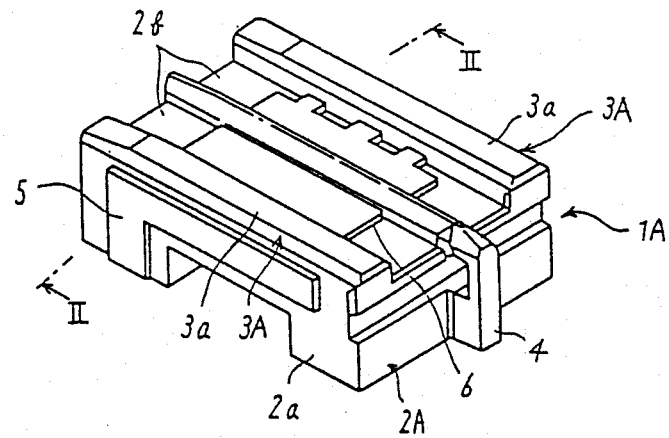
FIG. 1 is a perspective view of the structure of a conventional floating magnetic head.
Figure 2:
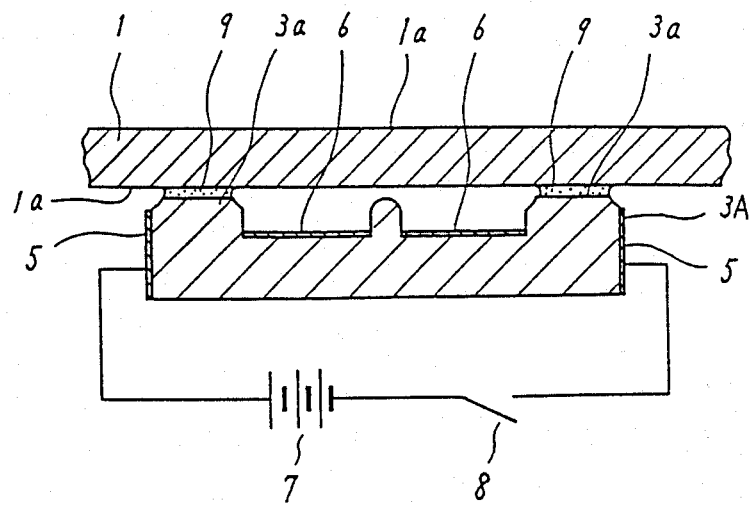
FIG. 2 is a cross-sectional view taken along the line II—II of FIG. 1.
Figure 3:
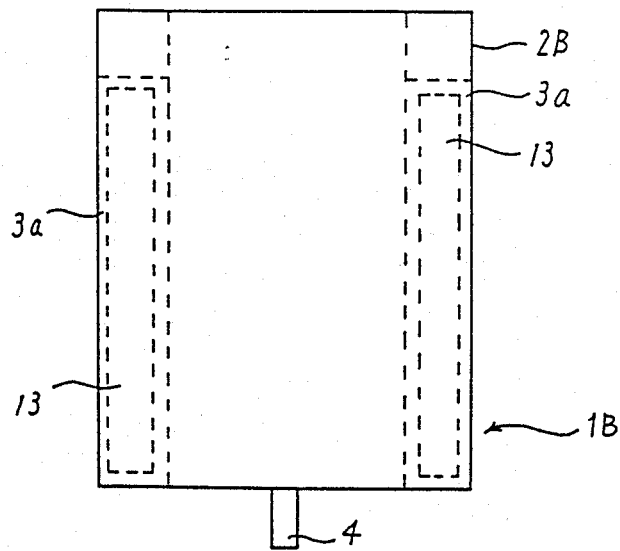
FIGS. 3 and 4 are a plan and a front view of the structure of a floating magnetic head in accordance with the present invention.
Figure 4:
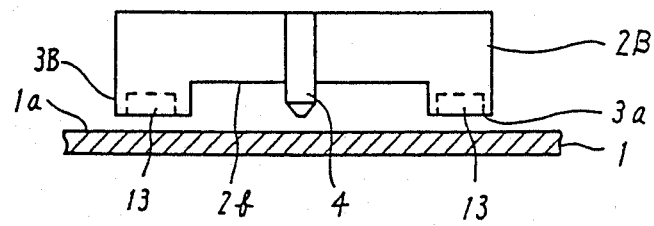
Figure 5:
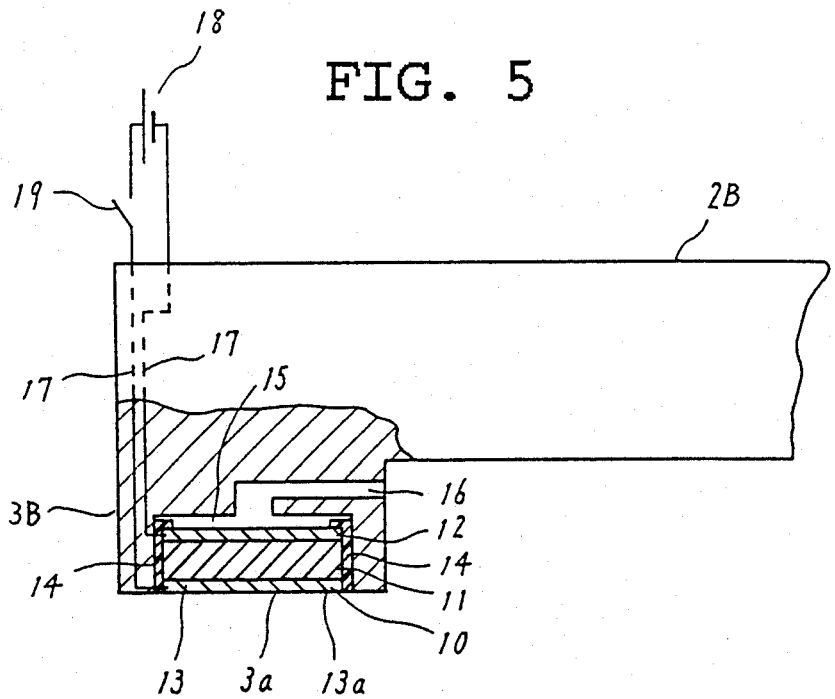
FIG. 5 is a partially sectional view of the floating magnetic head shown in FIG. 3, illustrating the internal structure of a slider portion.

FIGS. 3 to 5 show the structure and essential portions of a floating magnetic head 1B in accordance with the present invention. In these figures, reference numerals which are the same as those shown in FIGS. 1 and 2 indicate corresponding or identical members. The floating magnetic head 1B has a magnetic head body 2B on which slider portions 3B are formed. A water removing member 13 such as that shown in FIG. 5 is embedded in a part of each floating surface 3a of the slider portion 3B which is capable of moving toward or away from the surface of the magnetic disk 1. The water removing member 13 is formed by lamination of an anode electrode 10, a proton-conductive solid 11, a cathode electrode 12. The water removing member 13 is embedded in such a manner that the floating surface 3a of the slider portion 3B and a surface 13a of the anode electrode 10 generally coincide with each other.

The anode electrode 10 is formed of a proton-electron mixed conductive solid. One of two surfaces of the proton-conductive solid 11 is contact-bonded to the anode electrode 10 by pressing or the like. The proton-conductive solid 11 is made of, for example, a β-alumina substitution product. The cathode electrode 12 is contact-bonded to the other surface of the solid proton conductor 11. The cathode electrode 12 is formed of a proton-electron mixed conductive solid which is composed of a metal or a metallic compound, from which a metal hydride can be formed, such as, for example, Pd, LaNi$_5$ or TiNi, or a metal oxide such as, for example, WO$_3$, ReO$_3$, MoO$_3$, MnO$_2$ or NiOOH.2H$_2$O. Insulation members 13 are interposed between side surfaces of the water removing member 13 and the slider portion 3B. A cavity 15 is formed between the water removing member 13 and the slider portion 3B at the side opposite to the surface 13a. The cavity 15 communicates with the outside of the slider portion 3B via a vent hole 16. Ends of a pair of lead wires 17 are connected to the anode electrode 10 and the cathode electrode 12, and the other ends of the lead wires 17 are connected to a dc power source 18 which provides a potential difference between the anode electrode 10 and cathode electrode 12. A switch 19 for turning on and off the dc power source 18 is provided in the line of one of the lead wires 17.

Figure 6:
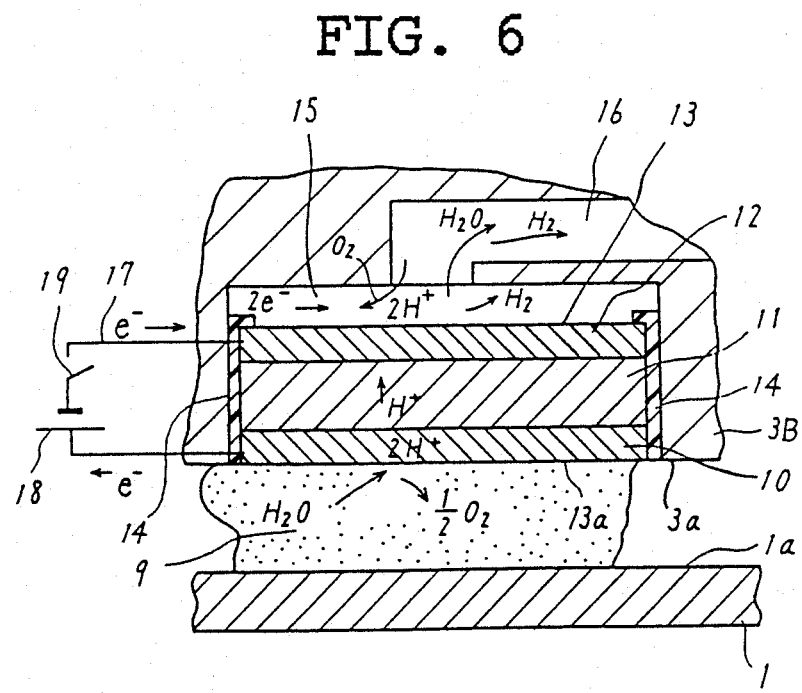
FIG. 6 is a cross-sectional view of the slider portion, illustrating the operation of a water removing member in accordance with the present invention.

The attraction-preventing operation performed by the floating magnetic head 1B in accordance with the present invention will be described with reference to FIG. 6. Water existing between the recording surface 1a of the magnetic disk 1 and the surface 13a of the water removing member 13 embedded in each slider portion 3B is electrolyzed on the surface 13a into hydrogen and oxygen when the anode electrode 10 and the cathode electrode 12 are energized by electric power supplied from the power source 18. Oxygen generated by the electrolysis stays in the gaseous state on the surfaces 13a. Hydrogen generated by the electrolysis releases electrons to the anode electrode 10 and becomes hydrogen ions. The hydrogen ions thereby formed proceed from the anode electrode 10 toward the cathode electrode 12 through the proton-conductive solid 11, and receive electrons on the cathode electrode 12 so that hydrogen is released therefrom into the cavity 15. A part of the released hydrogen reacts with oxygen to form water. Hydrogen and water thereby formed are released from the cavity 15 to the atmosphere via the vent hole 16. This process is expressed by the following reaction formulas.

On the anode electrode:

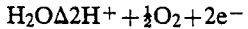

On the cathode electrode:

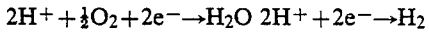

The proton-conductive solid 11 serves as a path through which H$^+$ which is obtained by decomposition of water is discharged. The anode electrode 10 and the cathode electrode 12 are formed of a proton-electron mixed conductive solid made of, for example, WO$_3$ and function in such a manner that charge carriers change from electrons to H$^+$ ions on the anode electrode 10 and from H$^+$ ions to electrons on the cathode electrode 12. Thus, external electrical energy can easily be converted into substance transfer work for removing water. That is, water in the gap between the recording surface 1a and the water removing member 13 can be removed by electrolysis. In this process, substantially no heat is generated in the magnetic head body 2B.

Figure 7:
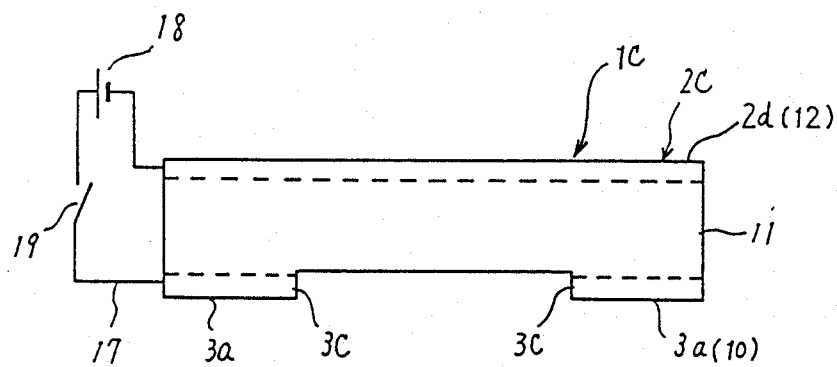
FIG. 7 is a schematic diagram of a magnetic head body which represents another embodiment of the present invention.

Another embodiment of the present invention will be described with reference to FIG. 7 which schematically illustrates a magnetic head body 2C. The whole of the magnetic head body 2C serves as a water removing member. That is, the entire areas of floating surfaces 3a of a pair of slider portions 3C are formed as anode electrode 10. The entire area of a surface 2d opposite to the floating surfaces 3a is formed as a cathode electrode 12. A portion of the magnetic head body 2C between the electrodes 10 and 12 is entirely formed of a proton-conductive solid 11.

The anode electrode 10 and the cathode electrode 12 of the thus constructed floating magnetic head 1C are connected to a power source 18 via load wires 17 and a switch 19 in the same manner as in the case of the head shown in FIG. 3. When the switch 19 is closed, a voltage of the power source 18 is applied across the anode electrode 10 and the cathode electrode 12, thereby removing, by electrolysis, water generated between the recording surface 1a and the floating surface 3a.

Figure 8:
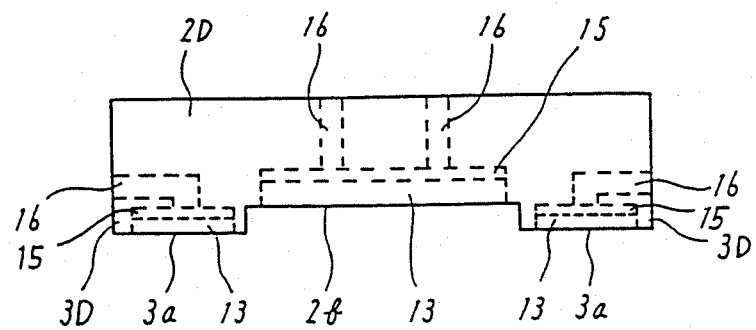
FIG. 8 is a schematic diagram of a magnetic head body which represents still another embodiment of the present invention.

A still another embodiment of the present invention will be described with reference to FIG. 8 which schematically illustrates a magnetic head body 2D. A water removing member 13 is provided in each of slider portions 3D of the magnetic head 2D in a manner similar to that in the case of the head shown in FIG. 3 while another water removing member 13 is provided in a groove 2b formed in the magnetic head body 2D. A cavity 15 is provided through which hydrogen generatd and water formed by chemical reaction between hydrogen and oxygen are led to the atmosphere. A vent hole 16 is also provided inside the magnetic head body 2D for venting the cavity 15 to the outside of the magnetic head body 2D. This construction ensures a higher water removing performance compared with the above-described embodiments.

In the above-described embodiments, the anode electrode 10 or the cathode electrode 12 is contact-bonded to the proton-conductive solid 11 by pressing, however, it may be performed by other methods of high-pressure contact bonding. The electrode 10 or 12 may also be formed by vapor deposition instead of contact bonding. If the water removing member 13 is manufactured by contact bonding, boundary surfaces are definitely formed between the electrodes 10 and 12 and the proton-conductive solid 11. These boundaries exhibit some resistance to passage of hydrogen ions. To cope with this, power of the substance constituting the anode electrode 10 or the cathode electrode 12 is mixed with powder of an electrolyte, then the mixed powder is interposed between the boundary surfaces, and thereafter the boundary surfaces are press-molded, thereby reducing the resistance to passage of hydrogen ions.

The above-described embodiments exemplify the cases in which the present invention is applied to monolithic heads. However, the present invention also enables similar functions and effects when applied to thin-film heads.

In the above-described embodiments, the proton-conductive solid 11 is constituted by a $\beta$-alumina substitution product. However, the material of this proton-conductive solid can be selected from other substances, including solid-polyelectrolyte potassium dihydrogen phsphate ($KH_4PO_4$), so long as it allows hydrogen ions to travel therethrough.

What is claimed is:

1. A floating magnetic head comprising:
   a magnetic head body;
   a slider means provided on said magnetic head body and having a floating surface disposed generally in parallel with a plane on which a magnetic disk rotates, said floating surface capable of moving toward and away from a surface of said magnetic disk; and
   a water removing member formed in at least a portion of said floating surface of said slider means for electrolytically removing any existing water between the floating surface of said slider means and the surface of said magnetic disk.

2. A floating magnetic head according to claim 1, wherein said slider means comprises at least two slider portions disposed in parallel with each other with at least one groove formed between adjacent ones of said slider portions; and said water removing member is provided in at least a portion of each of said at least two slider portions.

3. A floating magnetic head according to claim 1, wherein said water removing member comprises a cathode electrode, a proton-conductive solid laminated on said cathode electrode, an anode electrode laminated on said proton-conductive solid and facing the surface of said magnetic disk, and a power source connected between said cathode electrode and said anode electrode for supplying dc power thereto.

4. A floating magnetic head according to claim 3, wherein at least one of said cathode electrode and said anode electrode is formed of a proton-electron mixed conductive solid.

5. A floating magnetic head according to claim 4, wherein said proton-electron mixed conductive solid is formed from a metal or a metallic compound from which a metal hydride can be formed.

6. A floating magnetic head according to claim 5, wherein said metal or metallic compound is selected from a group of Pa, $NaNi_5$, and TiNi.

7. A floating magnetic head according to claim 4, wherein said proton-electron mixed conductive solid is formed from a metal oxide.

8. A floating magnetic heat according to claim 7, wherein said metal oxide is selected from a group of $WO_3$, $ReO_3$, $MoO_3$, $MnO_2$, and $NiOOH.2H_2O$.

9. A floating magnetic head according to claim 3, wherein said proton-conductive solid is formed from a $\beta$-alumina substitution product.

10. A floating magnetic head according to claim 3, wherein said proton-conductive solid is formed from a solid polyelectrolyte.

11. A floating magnetic head according to claim 10, wherein said solid polyelectrolyte includes a potassium dihydrogen phosphate.

12. A floating magnetic head according to claim 2, further comprising another water removing member disposed in said groove formed in said adjacent slider portions.

13. A floating magnetic head according to claim 1, wherein a cavity is formed inside said magnetic head body over a surface of said water removing member oppposite to the surface of said magnetic disk, said cavity communicating with the outside air via a vent hole.

14. A floating magnetic head according to claim 1, wherein the whole of said magnetic head body is formed as a water removing member which has an anode electrode formed over the entire area of at least one floating surface, a proton-conductivity solid laminated on said anode electrode, and a cathode electrode laminated on said proton-conductive solid.

* * * * *